Patented Dec. 20, 1927.

1,653,234

UNITED STATES PATENT OFFICE.

THOMAS SMITH, OF TEDDINGTON, AND JOHN HENDRI DOWELL, OF LONDON, ENGLAND, ASSIGNORS TO ADAM HILGER, LIMITED, OF LONDON, ENGLAND.

TESTING AND FINISHING OPTICAL ELEMENTS.

Application filed April 4, 1925, Serial No. 20,705, and in Great Britain April 8, 1924.

According to this invention, in the testing and finishing of optical elements where the angle between the incident beam and the element under test is varied for the examination of different parts of the field and the image receiver is displaced towards or away from the element as that angle varies, an object is provided at a finite distance from the element and is caused to be displaced conjointly with the displacement of the image receiver so as to maintain the object in a predetermined object surface and the image receiver in correct adjustment with respect to the conjugate image surface. The light from the object may be passed to a partially silvered plate by which part of the light is reflected to a mirror and part again to the plate, whilst the other part of the light passes through the element under test and is reflected back by a spherical mirror to the partially silvered plate and recombined with the other part of the light, thereby indicating the faults of the element under test by the interference rings produced.

Figure 1:
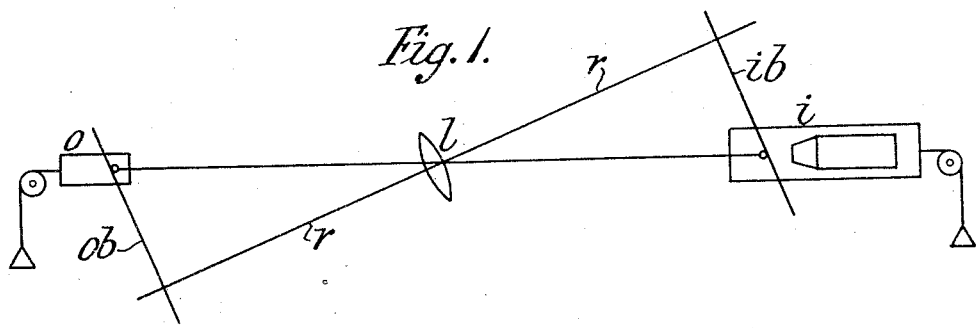
Figure 2:
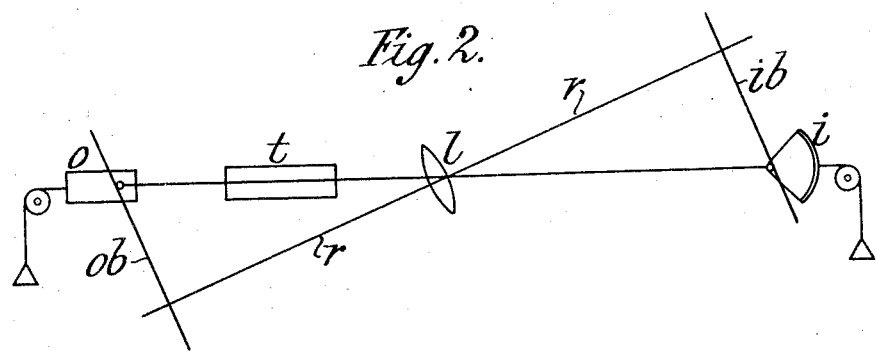
Figure 3:
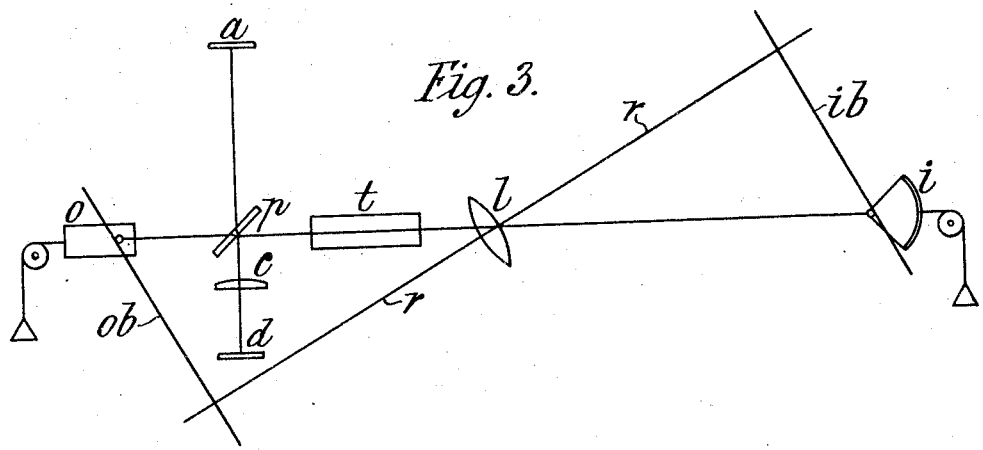

Figures 1, 2 and 3 show diagrammatically three apparatus made in accordance with this invention. In all the figures $l$ is the element under test, $o$ is the object and $i$ the image receiver. The lens $l$ is mounted upon a carriage through which passes a rod $r$, to the ends of which are secured cross bars, a bar $o\,b$ on the object side and a bar $i\,b$ on the image side, the object $o$ and the image receiver $i$ being kept in contact with the bars $o\,b$ and $i\,b$ respectively, for instance, by a cord passing over a pulley, there being a weight at the free end of the cord.

In Figure 2 a telescope $t$ is inserted between the object $o$ and the element $l$, and the image receiver is a spherical mirror.

Figure 3 is similar to Figure 2 except that a partially silvered plate $p$ is inserted between the object $o$ and the telescope $t$, part of the light passing as before through the element $l$ and the other part passing to a mirror $a$ by which it is reflected back to the plate $p$ where it is recombined with the light passing from the element $l$ and thence to a lens $c$ by which it is focussed to form an image at the aperture of a diaphragm $d$ whereby interference rings are produced which arrange themselves into what may be called a contour map of the imperfections of the element $l$.

By this means the object is maintained in a definite object surface and the image receiver in correct adjustment with respect to the conjugate image surface, corresponding to a constant magnification determined by the ratio of the two arms of the rod $r$. In other words the distances from the element under test of the image and object respectively both vary with the rotation of the element but always satisfy a definite linear relationship.

In the claims the words "optical element" are intended to include lenses, prisms or mirrors, or combinations of these, such as telescopes, and the words "image receiver" are intended to include a mirror or lens or system of lenses or a photographic plate or a metal plate upon which the image is received.

What we claim is:—

1. In testing and finishing of optical elements where the angle between the incident beam and the element under test is varied for the examination of different parts of the field and the image receiver is displaced towards or away from the element as the said angle varies, providing an object at a finite distance from the element and causing said object to be displaced conjointly with the displacement of said image receiver so as to maintain said object in a predetermined object surface and the image receiver in correct adjustment with respect to the conjugate image surface.

2. In testing and finishing of optical elements where the angle between the incident beam and the element under test is varied for the examination of different parts of the field and the image receiver is displaced towards or away from the element as the said angle varies, providing an object at a finite distance from the element and causing said object to be displaced conjointly with the displacement of said image receiver so as to maintain said object in the object surface corresponding to a predetermined magnification and the image receiver in correct adjustment with respect to the conjugate image surface.

3. In testing and finishing of optical elements where the element under test is rotated about a fixed axis for examination of different parts of the field and the image receiver is correspondingly displaced towards or away from said axis, providing an object at a finite distance from said element and causing said object to be displaced conjointly with the displacement of said image receiver so as to maintain a predetermined linear relation between the distances from said axis of the object and image receiver respectively.

4. Apparatus for testing and finishing optical elements comprising a holder for the optical element to be tested, means for rotating said holder about a fixed axis, an object holder, an image receiver, and means coacting with said first mentioned means for displacing said object holder and said image receiver so that the distances thereof, respectively, from the said axis vary but satisfy a predetermined linear relationship.

5. Apparatus for testing and finishing optical elements comprising a holder for the optical element to be tested, means for rotating said holder about a fixed axis, an object holder, an image receiver, a constant ratio lever turning about a fixed axis for displacing said object holder and said image receiver, said lever coacting with said means for rotating said holder for the optical element.

6. Apparatus for testing and finishing optical elements comprising a holder for the optical element to be tested, means for rotating said holder about a fixed axis, an object holder, an image receiver, a rod carried by said optical element holder, and cross bars carried by said rod abutting against said image receiver and said object holder respectively.

7. Apparatus for testing and finishing optical elements comprising a holder for the optical element to be tested, means for rotating said holder about a fixed axis, an object holder, a telescope between said object holder and said holder for the optical element, an image receiver, and means coacting with said first mentioned means for displacing said object holder and said image receiver so that the distances thereof respectively from the said axis vary but satisfy a predetermined linear relationship.

8. Apparatus for testing and finishing optical elements comprising a holder for the optical element to be tested, means for rotating said holder about a fixed axis, an object holder, a telescope between said object holder and said holder for the optical element, an image receiver, a constant ratio lever turning about a fixed axis for displaceing said object holder and said image receiver, said lever coacting with said means for rotating said holder for the optical element.

9. Apparatus for testing and finishing optical elements comprising a holder for the optical element to be tested, means for rotating said holder about a fixed axis, an object holder, a telescope between said object holder and said holder for the optical element, an image receiver, a rod carried by said optical element holder, and cross bars carried by said rod abutting against said image receiver and said object holder respectively.

In testimony that we claim the foregoing as our invention, we have signed our names this 27th day of March, 1925.

THOMAS SMITH.
JOHN HENDRI DOWELL.